United States Patent [19]

Matsumoto et al.

[11] 4,002,244

[45] Jan. 11, 1977

[54] BUFFER, PARTICULARLY SUITABLE FOR USE IN RAILWAY VEHICLES

[75] Inventors: Kiyoshi Matsumoto, Yokohama; Toshiyuki Maeda, Tokyo, both of Japan

[73] Assignee: The Japan Steel Works Ltd., Tokyo, Japan

[22] Filed: May 7, 1976

[21] Appl. No.: 684,444

Related U.S. Application Data

[63] Continuation of Ser. No. 542,113, Jan. 20, 1975, abandoned.

[30] Foreign Application Priority Data

Oct. 24, 1974  Japan .................... 49-121959

[52] U.S. Cl. ................ 213/43; 188/268; 188/269; 213/45; 267/64 R
[51] Int. Cl.² ........................ B61G 9/16
[58] Field of Search ............. 213/43, 45; 267/35, 267/34, 64 R; 188/268, 269, 316; 293/DIG. 2

[56] References Cited

UNITED STATES PATENTS

| 3,729,101 | 4/1973 | Brambilla et al. | 213/43 X |
| 3,843,601 | 10/1974 | Bruner | 188/268 X |
| 3,879,023 | 4/1975 | Pearce et al. | 267/64 R |
| 3,944,270 | 3/1976 | Kreuzer | 213/43 X |

OTHER PUBLICATIONS

Spooner, L. W., Silicon Putty as an Engineering Material, Product Engineering, Jan. 1950, pp. 90–93.

*Primary Examiner*—Robert B. Reeves
*Assistant Examiner*—John P. Shannon

[57] ABSTRACT

A buffer, particularly suitable for use in railway vehicles, comprising a cylinder including a movable piston and a buffer fluid contained therein, the buffer fluid formed of a very high-viscosity fluid such as silicone oil, and at the same time the cylinder includes a gaseous medium having a volume at least corresponding to the displacement of the piston rod of the piston when it moves in the cylinder to the end of its stroke.

6 Claims, 6 Drawing Figures

BUFFER, PARTICULARLY SUITABLE FOR USE IN RAILWAY VEHICLES

This application is a continuation of application Ser. No. 542,113 filed Jan. 20, 1975, now abandoned.

The present invention relates to a buffer, and more particularly to a buffer suitable for use in railway vehicles.

A buffer for use in railway vehicles is known wherein a piston is shiftably disposed within a cylinder which is filled with fluid having low viscosity e.g. conventional hydraulic oil or silicone oil, and the piston is adapted to receive an impact generated such as by railway vehicles when they are coupled. The piston is then forced to be moved in the fluid within the cylinder against its viscosity so that the impact is effectively absorbed by the fluid resistance. However, in this type of buffer, as the piston is moved forward in the cylinder its piston rod gradually enters the fluid to displace the volume of the fluid by the volume of the entering piston rod. This results in compressing the fluid within the cylinder so highly that the constitutional components of the buffer are necessarily made rigid, which in turn makes the buffer massive and costly. Attempts have been made to avoid the disadvantages of a buffer of this kind by providing an air chamber within the cylinder which is positioned by rubber or a free piston and which has a volume larger than the volume to be displaced by the piston rod when it enters the cylinder at its stroke end. The air chamber is thereby adapted to decrease in volume as the piston rod enters the cylinder to suppress the increase of the pressure of the fluid in the cylinder as disclosed in U.S. Pat. Nos. 2,410,176 and 2,779,446. However, the provision of such an air chamber in the cylinder is not desirable since it not only makes the cost of the buffer high, but also shortens its life due to damage to or leakage from the air chamber.

SUMMARY OF THE INVENTION

It is an object of the present invention to provide a buffer for use in railway vehicles of the type referred to above which can eliminate the foregoing drawbacks.

It is another object of the present invention to provide a buffer for use in railway vehicles of the type referred to above which has a very large buffer capacity using a relatively simple construction.

It is a further object of the present invention to provide a buffer for use in railway vehicles of the type referred to above wherein the beginning of the piston stroke can be previously selected to be adapted to the weight and speed of the railway vehicles to be buffered.

A buffer for use in railway vehicles of the type referred to above is provided according to the present invention with cylinder means and piston means shiftably contained in the cylinder means. A piston rod is connected at one end to the piston means and at the other end to pressure receiving means. Elastic means is disposed between the cylinder means and the pressure receiving means. The interior of the cylinder means is filled with a fluid having a very high viscosity together with a predetermined volume of a gaseous medium.

In the buffer for use in railway vehicles of the type referred to above according to the present invention the low load portion of its buffer characteristic diagram at the beginning of the piston stroke, when it is subjected to an impact generated by the coupling of railway vehicles, can be easily regulated by the previous adjustment of the volume of the gaseous medium filling the cylinder together with the features of the fluid having a very high viscosity.

BRIEF DESCRIPTION OF THE DRAWINGS

These and other objects of the present invention will become more apparent from the following description taken in connection with the accompanying drawings wherein is set forth by way of illustration and example one embodiment of the present invention, in which.

DESCRIPTION OF THE PREFERRED EMBODIMENT

Figure 1:
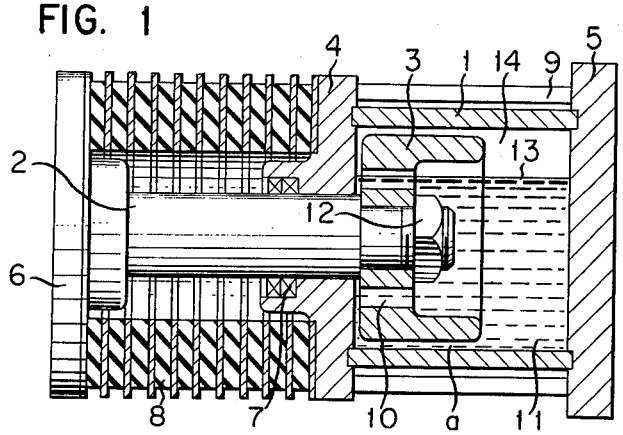
FIG. 1 is a longitudinal sectional view of one embodiment of the present invention in a no load state.
Figure 2:
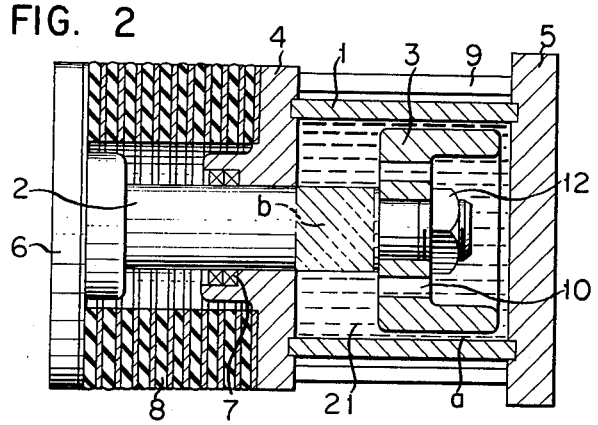
FIG. 2 is a similar view to FIG. 1, but in a state of being subjected to a strong impact.

Referring now to FIGS. 1 and 2 of the drawings, one embodiment of a buffer according to the present invention comprises mainly the following elements represented respectively by their specific reference numerals:

1: cylinder
2: piston rod
3: piston, there being formed between its outer periphery and the inner periphery of cylinder 1 an annular gap $a$ of substantial dimensions
4, 5: flanges
6: pressure receiving board
7: packing
8: resilient member such as rubber or metallic spring
9: bolts to fixedly and sealingly secure cylinder 1 to the confronting surfaces of flanges 4 and 5 in circular grooves formed respectively therein
10: orifices drilled in the wall of piston 3
11: fluid such as silicone oil or silicone rubber having a very high viscosity such as $10^3$ to $10^5$ poise (hereinafter referred to as "high viscosity silicone") and partially filling cylinder 1 so as to leave a space to be occupied by an appropriate gaseous medium
12: nut to fixedly secure piston 3 at its bottom wall to one end of piston rod 2, the other end of piston rod 2 being fixedly secured to the inner surface of pressure receiving board 6 by any suitable means.

Further, in FIG. 1, the reference numeral 13 represents a boundary surface between the fluid 11 and a gaseous medium occupying space 14 above the level of the fluid when the buffer is assembled or after it has been left alone for a long period of time.

In operation of the buffer having such a constitution as abovesaid, after it is mounted on railway vehicles in a manner well known in the art, any shock received by the vehicles which is generated at the time of their collision, or coupling, or during the running of the vehicles as a train, is transmitted to the buffer through pressure receiving board 6 via couplings between adjacent vehicles thereby compressing the buffer. Accordingly, the impact causes piston 3 to begin to move to the right as viewed in FIG. 1 through piston rod 2. In this case, since the interior of cylinder 1 is filled with the high viscosity silicone 11 having a very high viscosity on the order of $10^3$ to $10^5$ poise, if a gaseous medium does not coexist in the interior of cylinder 1, the high viscosity silicone 11 would be compressed by a volume $b$ corresponding to the displacement of piston rod 2 entering the interior of cylinder 1 as shown in FIG. 2 in the hatched area. In this case, it is impossible to make the diameter of piston rod 2 too small in view of the required strength of the buffer, so the volume $b$ becomes necessarily large, and in extreme cases the pressure of the high viscosity silicone 11 reaches as high as several thousand kg/cm², which results in having to make cylinder 1, flanges 4 and 5, packing 7, or bolts 9 very stiff to resist such an ultra high pressure, whereby the cost and the weight of the overall buffer are naturally increased. In order to avoid such disadvantages it is necessary, as previously explained to provide in the interior of cylinder 1 a gas chamber partitioned by rubber or a free piston having a volume larger than the displacement $b$ of piston rod 2 as taught by conventional buffers. When such a gas chamber is provided, the increase of the inner pressure of cylinder 1 at the time of the full stroke of piston rod 2 may be made to be several kg/cm² at the highest. However, the provision of such a gas chamber not only requires a considerable cost, but also makes the overall volume of the buffer large, and there is the fear of damage or leakage during its use over a long period.

In this case it will also be noticed that, if such a gas chamber is not provided and such a feature as allowing the direct contact of the gas with the fluid contained in the interior of cylinder 1 is adopted, when the viscosity of the fluid is low as 0.1 to 1 poise as usually used in conventional buffers, the gaseous medium is easily intermingled with the fluid as the piston reciprocates so that an emulsion is produced rather than producing fluid containing uniformly distributed small gas bubbles, which makes the buffer unable to operate effectively, as U.S. Pat. No. 2,719,612 describes in column 8, line 54 and the following.

In the buffer according to the present invention, instead of providing such a gas chamber, a space 14, the volume of which is preferably equal to or up to three times the displacement $b$ of piston rod 2, is left in cylinder 1 above level 13 of the high viscosity silicone 11 which level is maintained by the fluid at the time of the assembly of the buffer or after the buffer is left alone for a long period, the space 14 being filled with a gaseous medium, preferably air.

In the buffer according to the present invention having such a constitution, when piston rod 2 is moved to the right as viewed in FIG. 2 due to its being subjected to the shock of the railway vehicles, the high viscosity silicone 11 and the gaseous medium contained in space 14 are forced to be suddenly moved from the right to the left through orifices 10 drilled in the wall of piston 3 and/or through an annular gap $a$ formed between the inner surface of cylinder 1 and the outer surface of piston 3. In this case, the high viscosity silicone 11 and the gaseous medium, due to their being subjected to the shock several times, enter a state in which, as shown in FIG. 3, the fine bubbles 20 of the gaseous medium are substantially uniformly distributed throughout the high viscosity silicone, and this viscous fluid 21 containing fine bubbles 20 acts as a buffer fluid.

Further, it will be appreciated that, since the fluid is high viscosity silicone as above mentioned, the difference of the viscosities between the original high viscosity silicone 11 and the viscous fluid 21 containing fine bubbles 20 is so small that usual viscosity measuring instruments cannot detect it. Therefore, the shock absorbing characteristic of the buffer having this viscous fluid 21 containing fine bubbles 20 is substantially identical to that having only high viscosity silicone.

In addition, since it takes a few days before the gaseous medium once having been distributed in the high viscosity silicone as fine bubbles is separated from the silicone to recover the state as shown in FIG. 1 due to the high viscosity of the silicone, as a practical matter the gaseous medium contained in the buffer is always in the state of being uniformly distributed in the fluid, which assures a constant shock absorbing characteristic of the buffer regardless of the state of the train whether it is running or stopping.

Figure 3:
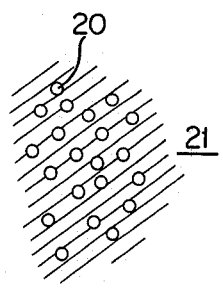
FIG. 3 is a diagrammatic view to qualitatively show the bubbles of a gaseous medium in the no load state which are uniformly distributed in the fluid having a very high viscosity.
Figure 4:
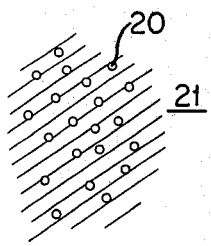
FIG. 4 is similar to FIG. 3, with the gaseous medium in the state of being subjected to a load.
Figure 6:
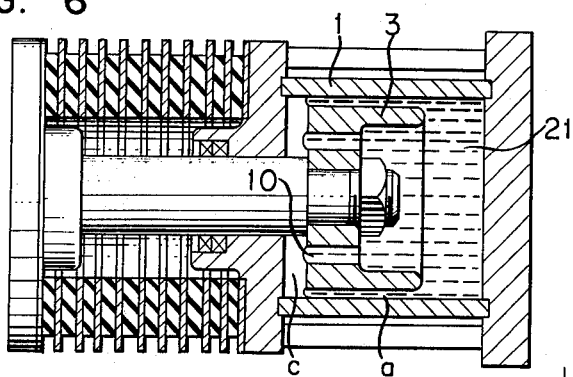
FIG. 6 is a longitudinal sectional view of the buffer shown in FIGS. 1 and 2 at an early stage of the stroke when it is subjected to an impact.
Figure 5:
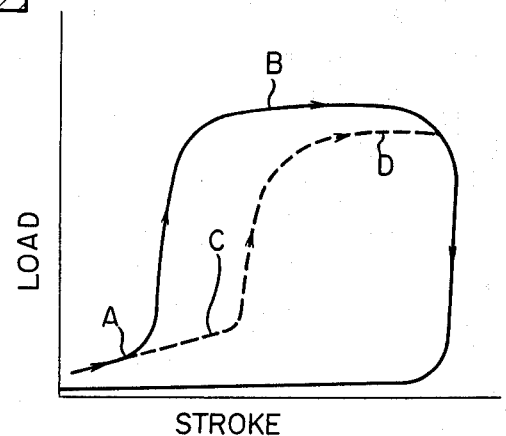
FIG. 5 shows the buffer characteristic of the buffer according to the present invention in the case of the volume of the gaseous medium in the cylinder being low and also that of it being large, wherein the abscissae and the ordinate represent the stroke of the piston and the load absorbed, respectively.

When the buffer according to the present invention which contains viscous fluid 21 in the state as shown in FIG. 3 is subjected to impact, it absorbs the impact by compressing respective bubbles 20 as shown in FIG. 4. In this case, as shown in a characteristic diagram represented in FIG. 5 by the solid line in the early stage of the stroke of piston 3 of the buffer, due to the viscosity of fluid 21 being very high, its movement from right to left through orifices 10 and/or gap $a$ shown in FIG. 6 cannot occur. The fine bubbles 20 of the gaseous medium distributed in viscous fluid 21 are thereby compressed to become very fine bubbles as shown in FIG. 4, whereby the pressure of the gaseous medium first reaches as high as several ten kg/cm². As a result, the apparent volume of fluid 21 containing fine bubbles 20 decreases, thereby allowing piston 3 to move to the right by an amount equivalent to such a decrease in the apparent volume of viscous fluid 21. In this case the space $c$ behind the bottom wall of piston 3 is under vacuum. Subsequently, as the stroke of piston 3 advances further, viscous fluid 21 containing fine bubbles 20 moves from right to left through orifices 10 drilled in the wall of piston 3 and/or gap $a$ formed between the inner wall of cylinder 1 and the outer surface of piston 3, whereby piston 3 encounters a very strong resistance from the fluid. Thus, at the early stage of the stroke of piston 3 wherein only the compression of the gaseous medium contained in fluid 21 as fine bubbles 20 occurs, the force absorbed by the buffer is small and, after the movement of fluid 21 containing very fine bubbles 20 as shown in FIG. 4 through orifices 10 and/or gap $a$ begins, a larger force is absorbed due to the very high viscosity of fluid 21. As the result of this the property of the buffer according to the present invention is such that, as represented by the curve A, it is shown to absorb only a low load at the early stage of the impact due to the compression of bubbles 20 in viscous fluid 21. Thereafter a higher load is absorbed as represented by the curve B due to the movement of viscous fluid 21. Thus the buffer can absorb as a whole large buffer energy.

When the buffer according to the present invention is to be used for a lightweight railway vehicle, or a low runningspeed vehicle, the energy to be absorbed is relatively low. In this case the stroke during the low load absorbing portion of the characteristic curve occurring at the early stage of the impact can be prolonged, as shown in the curve C represented by the dot-dash line, by increasing the volume of the gaseous medium. The shock at the time of the impact can then be gently absorbed, the characteristic curve C being followed at the end of the low load absorbing region by the curve D representing a higher load absorbing region.

It will be understood that after completion of the stroke, piston 3 is returned to its initial state by the action of resilient member 8 which has been compressed with the stroke of piston 3. Further it will be appreciated that though there is a separation of the high viscosity silicone and the gaseous medium in the cylinder when the buffer is assembled or after it has stood still for a long period of time, once the gaseous medium is uniformly distributed in the high viscosity silicone as fine bubbles, this state is usually maintained for a relatively long period due to the very high viscosity of the fluid as mentioned heretofore.

It is to be understood that although a single form of this invention has been illustrated and described, it is not to be limited thereto except insofar as such limitations are in the following claims.

What we claim is:

1. A buffer, particularly for use in railway vehicles, comprising
    a cylinder means;
    a piston means having a piston rod and connected piston slidably mounted for reciprocable movement within said cylinder means;
    the periphery of said piston spaced from said cylinder means to form a gap therebetween;
    orifices formed to extend through said piston;
    said piston means movable from an at rest position to a first position upon being subjected to low load impact;
    said piston means movable further from said first position to a second position upon being subjected to a higher load impact;
    a buffer fluid partially filling said cylinder means;
    a gaseous medium filling the remainder of said cylinder means;
    the volume of said gaseous medium being at least equal to the volume of said rod when fully extended within said cylinder means;
    said buffer fluid having a high viscosity of $10^3$ to $10^5$ poise to allow uniform distribution throughout of fine bubbles of said gaseous medium that are compressible to absorb the low load impact at the first position of said piston means and prevent movement of said high viscosity fluid through said orifices and said gap; and
    said buffer fluid flowing through said orifices and said gap to absorb the higher load impact when said piston means moves to said second position; and
    means to return said piston means from said second position to said at rest position.

2. A buffer according to claim 1 wherein said volume of said gaseous medium is up to three times the volume of said piston rod when fully extended within said cylinder means.

3. A buffer according to claim 1 wherein said buffer fluid is silicone oil.

4. A buffer according to claim 1 wherein said buffer fluid is silicone rubber.

5. A method of absorbing a load in a railway vehicle buffer having a piston located in a cylinder that is partially filled with a silicone fluid having a viscosity of $10^3$ to $10^5$ poise and the remainder of said cylinder filled with a gaseous medium so that when the buffer has been in an at rest position for a substantial length of time, the fluid and the gaseous medium are completely separated, comprising
    moving said piston in one direction to a first position under the impact of low load to compress the fine bubbles of the gaseous medium distributed uniformly throughout said buffer fluid, said bubble compression allowing said piston to move further in said direction an amount equivalent to the volume that said bubbles are compressed; and
    moving said piston further in said direction to a second position under the impact of higher load and allowing said buffer fluid to pass through said piston via orifices formed therein and a gap formed between said piston and its cylinder.

6. A method according to claim 5 wherein the movement of said piston during low impact is proportional to the volume of said gaseous medium whereby a delay in the increase of the load at time of impact is due to an increase in the volume of the gaseous medium thereby providing a longer piston stroke to the first position.

* * * * *